Feb. 27, 1945.   E. L. VIDAL   2,370,429
LAMINATED STRUCTURE AND METHOD FOR MAKING SUCH STRUCTURE
Filed Jan. 4, 1940
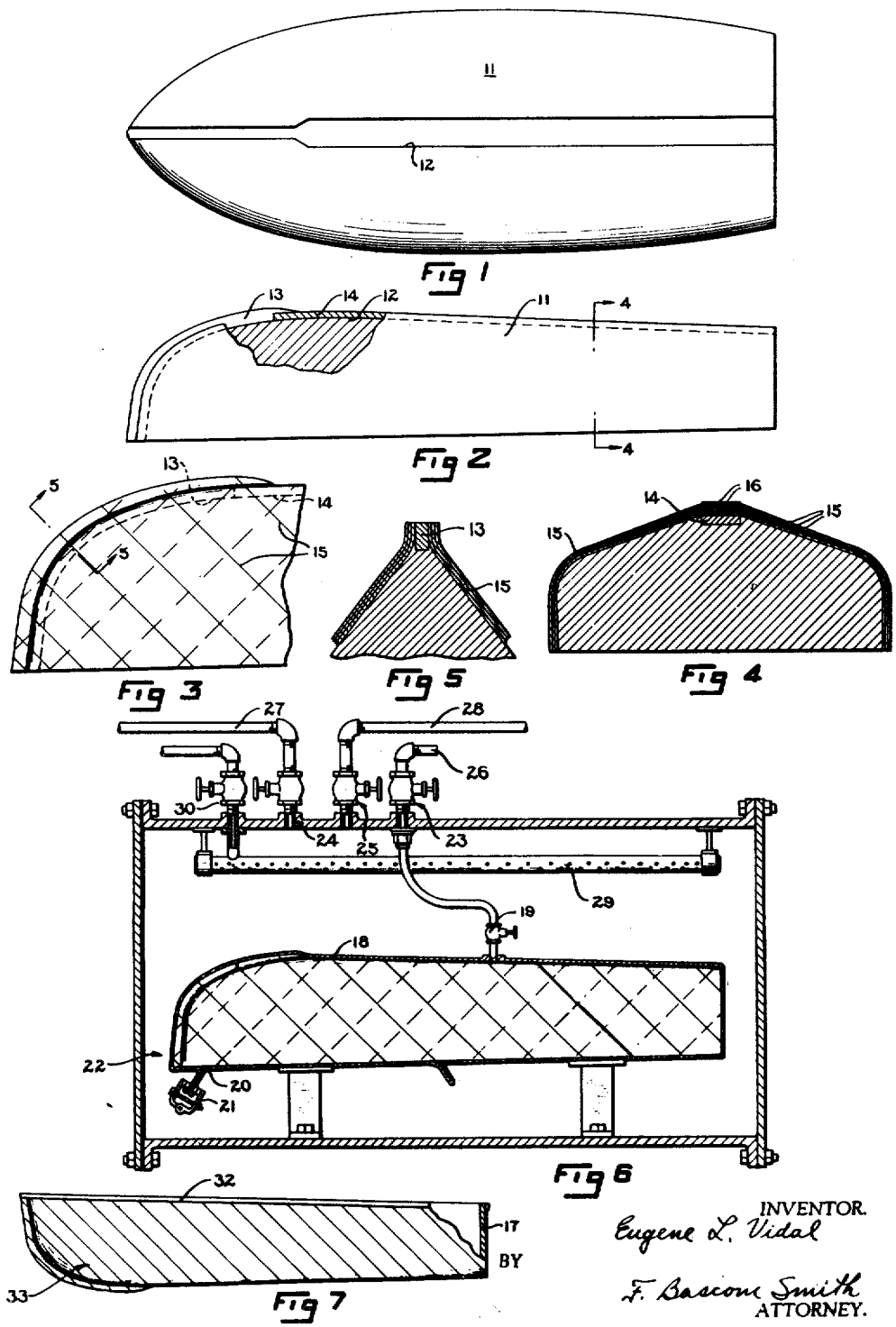
INVENTOR.
Eugene L. Vidal
BY
F. Bascom Smith
ATTORNEY.

Patented Feb. 27, 1945

2,370,429

UNITED STATES PATENT OFFICE 2,370,429

LAMINATED STRUCTURE AND METHOD FOR MAKING SUCH STRUCTURE

Eugene L. Vidal, New York, N. Y., assignor, by mesne assignments, to Vidal Corporation, a corporation of Delaware Application January 4, 1940, Serial No. 312,328

5 Claims. (Cl. 9—6)

This invention relates to laminated structures and methods of making the same, and more particularly to the fabrication of laminated structures by the use of fluid pressure.

An object of the invention is to provide a novel method whereby layers of material coated with an adhesive are bonded into a unitary structure.

Another object is to provide a novel method for readily molding a plurality of laminations upon a removable mold into a desired shape as, for example, that of a boat hull or canoe.

Still another object is to provide a novel laminated structure having reinforcing members molded thereto and a novel method whereby said structure and said members are simultaneously molded upon a removable mold.

A further object is to provide a novel boat hull structure formed from a plurality of veneer laminations.

Still another object is to provide a novel method for subjecting a mold and the assembly carried thereby to heat and pressure.

A further object is to provide a novel and simple method for making a laminated structure wherein a suitable separate control of pressure and temperature is attained.

A still further object is to provide a novel method for fabricating a water-proof structure from laminations of fibrous material.

The above and further objects and novel features of this invention will more fully appear from the following detailed description when the same is read in connection with the accompanying drawing. It is to be expressly understood, however, that the drawing is for purposes of illustration only and is not intended as a definition of the limits of the invention, reference being primarily had for this latter purpose to the appended claims.

In the drawing, wherein like reference characters refer to like parts throughout the several views, Fig. 1 is a top plan view of a mold adapted for use in carrying out the novel method of the present invention;

Fig. 2 is a side elevation with parts broken away of the above mold showing reinforcing members operatively positioned therein;

Fig. 3 is a fragmentary view in elevation of the mold with the laminations positioned thereon;

Fig. 4 is a sectional view of the mold taken substantially along line 4—4 of Fig. 2 with the laminated structure mounted thereon;

Fig. 5 is a somewhat enlarged fragmentary section taken substantially along line 5—5 of Fig. 3;

Fig. 6 is a view partly in section and partly in elevation showing the apparatus for carrying out the novel method of the invention; and, Fig. 7 is a view in side elevation showing the novel boat hull fabricated according to the present invention.

The novel method comprehended by the present invention is herein described as utilized for the purpose of fabricating, by way of example, a novel boat hull having surface portions of compound curvature. Laminations suitably treated with an adhesive, cement or thermoplastic are bonded by the novel method into an integral structural unit and in the fabrication of a boat hull said laminations comprise thin sheets or strips of material, preferably of wood veneer. The sheets are preferably treated with a thermoplastic adhesive such as polyvinyl butyral, the treatment consisting of applying the thermoplastic in any suitable manner as, for example, by dipping or spraying, and thereafter allowing the coated sheets to season. To insure a proper coating and impregnation of the veneer sheets, this treatment is repeated. A suitable plasticizer, such as dibutyl phthalate, can be mixed with the thermoplastic to make the impregnated sheets more flexible during molding, the quantity of plasticizer added to the thermoplastic varying inversely as the length of the radius of curvature of the shape into which the veneer sheets are to be formed. In the fabrication of a boat hull, a relatively small proportion of plasticizer is necessary because the greatest curvature of the boat hull has a comparatively large radius.

A mold 11, having the shape which it is desired to have the finished product take, is provided, and in the illustrated embodiment said mold closely conforms to the contours of a boat hull having double curved surfaces symmetrically disposed relative to the keel or center line. A longitudinal groove 12 is preferably provided in mold 11 along the keel line thereof, said groove, as shown, extending the length of the hull and being substantially wider at the middle and stern portions of the boat than at the bow. In carrying out the novel method, mold 11 is first coated with a non-adhesive material, for example, Cellophane or cellulose acetate, and then a pair of reinforcing strips 13 and 14 (Fig. 2) are positioned in groove 12. Bow strip 13 fills the narrower portion of said groove and is adapted to project a short distance beyond the hull contour, the projecting portion decreasing in height along the length of said strip from the bow backward. Stern strip 14 fills the remaining wider portion of groove 12 and is flush with the hull contour. It is preferable to have groove 12 shaped so that at the juncture of strips 13 and 14, stern strip 14 tapers to the width of strip 13 (Fig. 1), the latter strip being adapted to overlap the former for substantially the length of the taper (Fig. 2). For best results, strips 13 and 14 are thermoplastically treated in the above described manner prior to being positioned in the mold. It will be understood that a single strip suitably shaped could be utilized instead of strips 13 and 14, and that one or more additional grooves may be provided in mold 11 so that additional reinforcing strips can be molded simultaneously with the boat hull structure.

Thereafter a plurality of veneer strips or sheets 15, preferably of wood and also treated with a thermoplastic adhesive in the manner described heretofore, are positioned on mold 11 in several laminations. Sheets 15 are temporarily secured to said mold by a plurality of clips, cleats or elastic bands (not shown), and are of a width permitting the same to lie flatly on the double curved surface of the boat hull. To make it possible to use relatively wide sheets, sheets 15 are preferably positioned at an acute angle of approximately 45° to the keel line and the gunwale, and each sheet is of suitable length to extend from the gunwale to the keel and of a width suitable to effect substantial engagement with the double curved surfaces. To increase the strength of the molded structure, the sheets which comprise adjacent layers of laminations 15 are angularly disposed at approximately 90° to each other. The keel ends of those of sheets 15 which extend to bow strip 13 are adapted to engage and to form a lap joint with the latter, the laminations on one side of the hull being superposed on one side of said strip and the laminations on the other side of the hull being superposed on the other side of said strip (Fig. 5). The remainder of said sheets extend to and cover the surface of strip 14 by overlapping the latter to the center line thereof, and said sheets, together with said strip and longitudinally positioned sheets 16 interposed between laminations of sheets 15, are adapted to form a butt joint. Sheets 16 have a grain disposed at approximately 45° to the keel line to strengthen the joint of which said sheets are a part. A flat stern piece 17, which is shown as a solid piece (Fig. 7) is mechanically secured to the rear end of the hull after the latter has been molded, although it will be understood that the same can be molded together with said hull and can be formed from a plurality of veneer laminations.

A wooden boat or vessel constructed according to prior methods will leak until it has been sufficiently soaked in water to cause the seams thereof to close. By the present method of fabrication, it is possible to construct a water-tight vessel without soaking and one way of accomplishing this is by tapering or scarfing the edges of veneer laminations 15 and causing adjacent edges of said laminations to overlap when the latter are positioned on the mold. This waterproofing effect may also be attained by using sheets of thermoplastic, preferably of the kind with which laminations 15 have been treated, and to interpose these sheets of plastic between the edges of adjoining strips of laminations 15, said sheets when molded forming water-tight seals between the lamination edges.

This novel step for rendering the finished molded structure waterproof may also be carried out by treating a sheet of fabric, such as canvas, with the thermoplastic or other adhesive that has been used for treating sheets 15 and to interpose said fabric sheet between layers of the other sheets on the mold. The fabric not being exposed in the finished structure is not subjected to wear and abrasion during service but is nevertheless effective to waterproof the structure.

With the lamination suitably positioned and secured to mold 11, the exposed surfaces thereof may be coated with a non-adhesive, such as Cellophane or cellulose acetate, in preparation for the novel method whereby the parts on the mold are formed into a substantially integral unitary structure. The mold and the assembly carried thereby are first inserted into a flexible, impervious container 18 forming a pressure transmitting membrane provided with a valve controlled duct 19 and an open end 20 through which said mold is inserted. Opening 20 is thereafter sealed by suitable means, such as clamp 21, and then air is evacuated from said container through duct 19 to collapse the walls thereof and to urge said walls into close engagement with the assembly carried by the mold. Any folds or wrinkles in the walls of container 18 resulting from the collapse thereof may be manually positioned and smoothed at this stage of the operations, and when wrinkles cannot be avoided it is preferable to manipulate the same so that they engage portions of the mold not covered by laminations, thus leaving a single thickness of container wall smoothly and snugly engaging the laminations. This preliminary pressure application will also show whether the laminations have been suitably positioned on the mold and how the same will respond to further pressure application.

The evacuated container, mold and the assembly thereon are then inserted into a pressure chamber 22, preferably having three valve controlled passages 23, 24 and 25 connecting conduits 26, 27 and 28, respectively, to the interior of said chamber. Duct 19 is connected to passage 23 and the valve of said duct is opened while the valve of said passage is closed, thus maintaining the degree of vacuum attained in container 18. Passage 24 is connected by conduit 27 to a fluid pressure source, such as an air pump (not shown), and the pressure in chamber 22 is raised to approximately 20 pounds per square inch above atmospheric pressure by injecting compressed air therein. Passage 23 is then opened and opens the interior of container 18 to the atmosphere, the increased pressure in chamber 22 retaining said container in close engagement with the mold and mold assembly. It is to be understood that the preliminary evacuation of container 18 may take place through passage 23 after said container has been positioned in chamber 22 and duct 19 has been connected to passage 23.

To carry out the novel method of fabricating the laminations on the mold into a unitary structure, it is desirable to apply heat and pressure to the mold assembly until predetermined temperature and pressure levels are attained, to maintain said temperature and pressure for a predetermined period substantially at these levels, and thereafter to separately reduce the temperature and pressure to normal in the order named. Accordingly, after the pressure is raised to the initial level, as above described, the temperature is raised to its final value by injecting a heat transfer fluid, such as steam, into chamber 22 through passage 25. At the usual molding pressure the temperature of the steam is above 280° F.

and produces some lesser average temperature in chamber 22, enough steam being admitted into said chamber to attain the desired vulcanization temperature which is 280° F. or less. The steam inlet 25 is spaced at a sufficient distance from container 18 and the rate at which the steam is introduced into chamber 22 is preferably controlled so that no part of the laminated structure in said container is raised for any length of time to the high temperature of the inlet steam or to a temperature in excess of 280° F. Steam may be readily supplied at a minimum expense and expenditure of time and effort by a simple boiler (not shown) connected to conduit 28.

Compressed air is then pumped into chamber 22 to raise the pressure in said chamber to the desired molding pressure. If a relatively light structure is being fabricated, it has been found satisfactory to mold at a pressure of only 20 lbs. per sq. in., in which event the injection of compressed air at this time is only to maintain the pressure already attained in chamber 22. When the pressure and temperature values best adapted for molding the particular structure carried by mold 11 are attained, the same are substantially maintained by introducing small quantities of steam and compressed air into chamber 22, either continuously or at predetermined intervals. This treatment of the laminations at substantially constant temperature and pressure continues for a definite period until the thermoplastic has been intimately associated with the veneer fibres and the laminations have become fixed in relation to each other and the mold. The temperature is then rapidly decreased to normal, for example, by spraying a cooling medium, such as water, on the interior of chamber 22 through a sprinkler pipe 29 located adjacent the roof of said chamber. A conduit 30 carries the water through the wall of said chamber to said pipe. During this cooling operation, the pressure is maintained by a further admission of compressed air into chamber 22 so that the molding pressure remains applied to the laminations after the temperature has dropped to normal. The pressure is thereafter decreased to normal by opening one of the passages 24, 25 to the atmosphere. The temperature and pressure are relieved in this particular order to allow the thermoplastic to harden while the parts to be molded are held in close engagement with each other and in the exact shape which it is desired to have the same finally retain. As a result, adjoining layers of material, in addition to being properly shaped, are intimately associated and bonded together.

It will be understood that instead of attaining and maintaining the molding temperature by introducing a heating medium into chamber 22, as above described, the heating may be accomplished by providing pipes on the interior of chamber 22 or a jacket surrounding said chamber and thereafter passing a heating medium, such as steam, or hot air, through said pipes or said jacket. It is likewise possible to heat the air or other pressure applying fluid to the desired molding temperature before said fluid is admitted into chamber 22, or to associate heating means with the mold, said means comprising, for example, an electrical heating coil or pad connected by insulated conductors extending through container 18 to a suitable source of electrical energy.

It has been found satisfactory in the fabrication of a boat hull, having a total thickness of one-quarter inch constituted by three layers of sheets 15, to attain a pressure of 40 lbs. per sq. in. and a temperature of 240° F., and to treat the structure in the chamber for one and a half hours. If a thicker structure comprised of more or thicker laminations is to be made, it will require a longer treatment and/or higher temperatures and/or higher pressures and for a like structure the time of treatment can be decreased if the temperature and/or pressure is increased within certain limits and vice versa. The range of temperatures recommended for molding is from 200° to 280° F., and the pressure range is from 20 to 80 lbs. per sq. in. It is preferable, when possible, to operate at the higher temperatures and lower pressures.

In several instances, as for example, when laminations are applied to a structure for ornamental reasons and not to increase the strength of the structure, it has been found satisfactory to use pressures as low as 14 lbs. per sq. in. for molding, the pressure application being accomplished, for example, by inserting the laminations in a flexible container and then creating and maintaining a high degree of vacuum in said container. In rare instances, when fabricating structures which are very complex and heavy and/or which are to be formed from laminations of hard wood, it is possible and advisable to resort to pressure higher than 80 lbs. per sq. in. It is also possible to make laminated structures from thermoplastically treated layers of material by employing temperatures as low as 150°. However, temperatures lower than 200° F. and pressures lower than 20 lbs. per sq. in. are not recommended.

Although it is preferable to use a thermoplastic for treating the laminations and to accomplish the molding by applying heat as well as pressure, it is possible to carry out the novel method of the present invention by treating the laminations with an adhesive, such as urea formaldehyde, and by applying only pressure during molding.

At the completion of the vulcanization process, mold 11 and the laminated structure thereon are removed from chamber 22 and from container 20, said container being free of said mold and molded structure because of the non-adhesive material separating the same. The molded unitary boat hull structure is readily removed from the mold because of the non-adhesive layer therebetween. A solid stern piece 17 is then secured to the stern end of the molded hull by means, such as screws (not shown), and a gunwale reinforcing strip 32 is likewise secured to said hull, thereby producing a finished boat structure 33 (Fig. 7). It will be understood that said reinforcing strip could be secured to the hull by being molded therewith.

There is thus provided a novel process for the fabrication of laminated structures by treating veneer sheets with an adhesive, superposing said sheets to a desired thickness within a yieldable impervious container and applying heat and pressure to said container in a chamber to activate the adhesive and bind the laminations into a structural unit. The method includes a novel series of operations for applying and relieving the heat and pressure. The pressure is separately controlled and the thermoplastic adhesive is allowed to harden while the laminations are retained in fixed positions, the pressure remaining applied while the temperature is lowered. This may be accomplished by introducing a cooling medium into the chamber at the same time that compressed air is being injected therein. There is thus provided a novel method for fabricating a laminated structure having a high strength-to-weight ratio, said method being adaptable for quantity production and requiring a minimum of effort and expense.

Furthermore, there is provided a novel method for fabricating a laminated boat hull in a single molding operation whereby a boat which is very light and strong may be readily, economically and rapidly manufactured. There is also provided a novel process for waterproofing a boat hull or other vessel fabricated according to the method of this invention, said process dispensing with the soaking in water which has heretofore been necessary.

Although the method of the present invention has been illustrated and described for carrying out the fabrication of a novel boat hull, it is to be expressly understood that the method is not limited thereto but may be utilized for the fabrication of various other types of laminated structures, such as aeroplane wings and fuselages, skis, racquets, coffins and a wide variety of other objects. For a definition of the invention, reference will be had primarily to the appended claims.

What is claimed is:

1. The method of fabricating a laminated boat hull on a mold conforming to the shape of the hull which consists in treating veneer sheets with an adhesive, positioning one or more reinforcing strips along the keel line of said mold, superposing treated veneer sheets on said mold at an angle substantially less than 90° to the keel line of said mold, each sheet overlapping a reinforcing strip and extending from the latter to the edge of the mold, inserting the mold into a yieldable container, and subjecting said container to fluid pressure to bind the sheets and strips into a structural unit.

2. The method of fabricating a laminated boat hull on a mold conforming to the shape of a boat hull which consists in treating veneer sheets with an adhesive, positioning treated sheets at an angle to the keel line of said mold, said sheets extending on both sides of the mold from the keel to the gunwale line, positioning adhesively treated strips lengthwise along the keel line of said mold in engagement with the angularly disposed sheets, inserting the mold into a yieldable container, subjecting said container to heat and fluid pressure for a predetermined period in a chamber, and removing the heat and pressure at the termination of the period, thereby molding the sheets and strips into a boat hull having a reinforced joint along the keel line thereof.

3. The method of fabricating a laminated hollow member having double curved surfaces symmetrically disposed relative to a longitudinal center line on a mold conforming to the shape of the member which consists in treating veneer sheets with an adhesive, positioning treated sheets at an angle substantially less than 90° to the center line of said mold, said sheets extending on both sides of the mold from the center line to the mold edges and being of a width suitable to effect substantial engagement with the double curved surfaces, temporarily securing said strips to the mold, inserting the mold into a yieldable container, subjecting said container to heat and fluid pressure for a predetermined period in a chamber, and removing the heat and pressure at the termination of the period.

4. The method of fabricating a laminated boat hull on a removable mold from a plurality of adhesively treated sheets, said mold having the shape of a hull and a longitudinal groove extending along the keel line thereof, which consists in positioning one or more adhesively treated strips in said groove, temporarily securing a plurality of treated veneer sheets on said mold at an angle to the gunwale line, said sheets extending from the central strips to the gunwale line on both sides of the mold, placing said mold and the sheets thereon into a flexible container, applying heat and fluid pressure to said container in a chamber, and subjecting said container to the heat and pressure until the parts on the mold are formed into a laminated structural unit having the desired hull shape.

5. The method of fabricating a laminated boat hull on a mold conforming to the shape of the boat hull and having a groove extending along the keel line thereof which consists in placing one or more adhesively treated reinforcing strips in said groove to extend the length thereof, at least one of said strips extending beyond the surface of the mold, positioning a plurality of sheets of adhesively treated veneer at an angle to the keel line of said mold, said sheets extending from the keel line to the edge of said mold on both sides thereof and engaging the sides of said extending strip, temporarily securing said sheets to the mold, inserting the mold in a flexible container, and subjecting said container to heat and fluid pressure to simultaneously bond the veneer sheets and the strips into a structural unit.

EUGENE L. VIDAL.